US012785569B2

(12) United States Patent
Shen et al.

(10) Patent No.: US 12,785,569 B2
(45) Date of Patent: Nov. 3, 2026

(54) CONTROL CIRCUIT AND CONTROL METHOD OF TRANS-INDUCTOR VOLTAGE REGULATOR

(71) Applicant: Nanjing Silergy Micro Technology Co., Ltd., Nanjing (CN)

(72) Inventors: Zhiyuan Shen, Nanjing (CN); Peng Zhou, Nanjing (CN); Zhaolong Yu, Nanjing (CN)

(73) Assignee: Nanjing Silergy Micro Technology Co., Ltd., Nanjing (CN)

( * ) Notice: Subject to any disclaimer, the term of this patent is extended or adjusted under 35 U.S.C. 154(b) by 266 days.

(21) Appl. No.: 18/611,897

(22) Filed: Mar. 21, 2024

(65) Prior Publication Data

US 2024/0333160 A1 Oct. 3, 2024

(30) Foreign Application Priority Data

Mar. 29, 2023 (CN) ......................... 202310323477.2

(51) Int. Cl.
*H02M 3/158* (2006.01)

(52) U.S. Cl.
CPC ................................. *H02M 3/1586* (2021.05)

(58) Field of Classification Search
CPC .................................. H02H 9/02; Y02B 70/10
See application file for complete search history.

(56) References Cited

U.S. PATENT DOCUMENTS

| | | | | |
|---|---|---|---|---|
| 8,405,370 | B2 | 3/2013 | Chen | |
| 9,054,546 | B2 | 6/2015 | Zhao | |
| 9,287,782 | B2 | 3/2016 | Chen | |
| 9,444,441 | B2 | 9/2016 | Hou et al. | |
| 9,496,792 | B2 * | 11/2016 | Ouyang | H02M 3/1584 |
| 9,543,822 | B2 | 1/2017 | Hang et al. | |
| 10,476,378 | B2 | 11/2019 | Wang et al. | |
| 11,159,051 | B2 | 10/2021 | Yu et al. | |
| 11,303,204 | B1 * | 4/2022 | Zhao | H02M 3/1588 |
| 11,451,145 | B2 * | 9/2022 | Shao | H02M 1/0077 |
| 2021/0242784 | A1 | 8/2021 | Yang et al. | |
| 2023/0318430 | A1 * | 10/2023 | Chen | H02M 3/1586 323/271 |

* cited by examiner

*Primary Examiner* — Crystal L Hammond
*Assistant Examiner* — Nicolas Alden Chapa Mills

(57) ABSTRACT

An apparatus can include: a trans-inductor voltage regulator having switching circuits coupled in parallel between an input terminal and an output terminal of the trans-inductor voltage regulator, where each switching circuit corresponds to one of a plurality of transformers, each transformer comprises a first winding and a second winding, the first winding is configured as an inductor of the corresponding switching circuit, and the second windings are coupled in series; and a control circuit having an interval time adjusting circuit configured to adjust an interval time between turn-on moments of switching circuits of adjacent two phases in turn-on sequence when a load of the trans-inductor voltage regulator suddenly increases, such that an inductor current of each phase is not greater than a threshold current.

18 Claims, 6 Drawing Sheets

CONTROL CIRCUIT AND CONTROL METHOD OF TRANS-INDUCTOR VOLTAGE REGULATOR

RELATED APPLICATIONS

This application claims the benefit of Chinese Patent Application No. 202310323477.2, filed on Mar. 29, 2023, which is incorporated herein by reference in its entirety.

FIELD OF THE INVENTION

The present invention generally relates to the field of power electronics, and more particularly to control circuits and methods of trans-inductor voltage regulators.

BACKGROUND

Multiphase voltage regulators are widely used in high power and high current applications due to its relatively small voltage and current ripple, as well as excellent thermal performance. With development of big data and cloud services, operating currents of central processing units (CPUs) and graphics processing units (GPUs) are increasing, which requires fast transient performance of the associated voltage regulator. Multiphase trans-inductor voltage regulators (TLVRs) use a winding of the transformer as the output inductance of each phase, which can realize faster transient response, as compared with traditional multi-phase voltage regulators. However, some multiphase trans-inductor voltage regulators are potentially prone to inductor current overshoot and chip overheating in situations where the load changes at relatively high speed.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
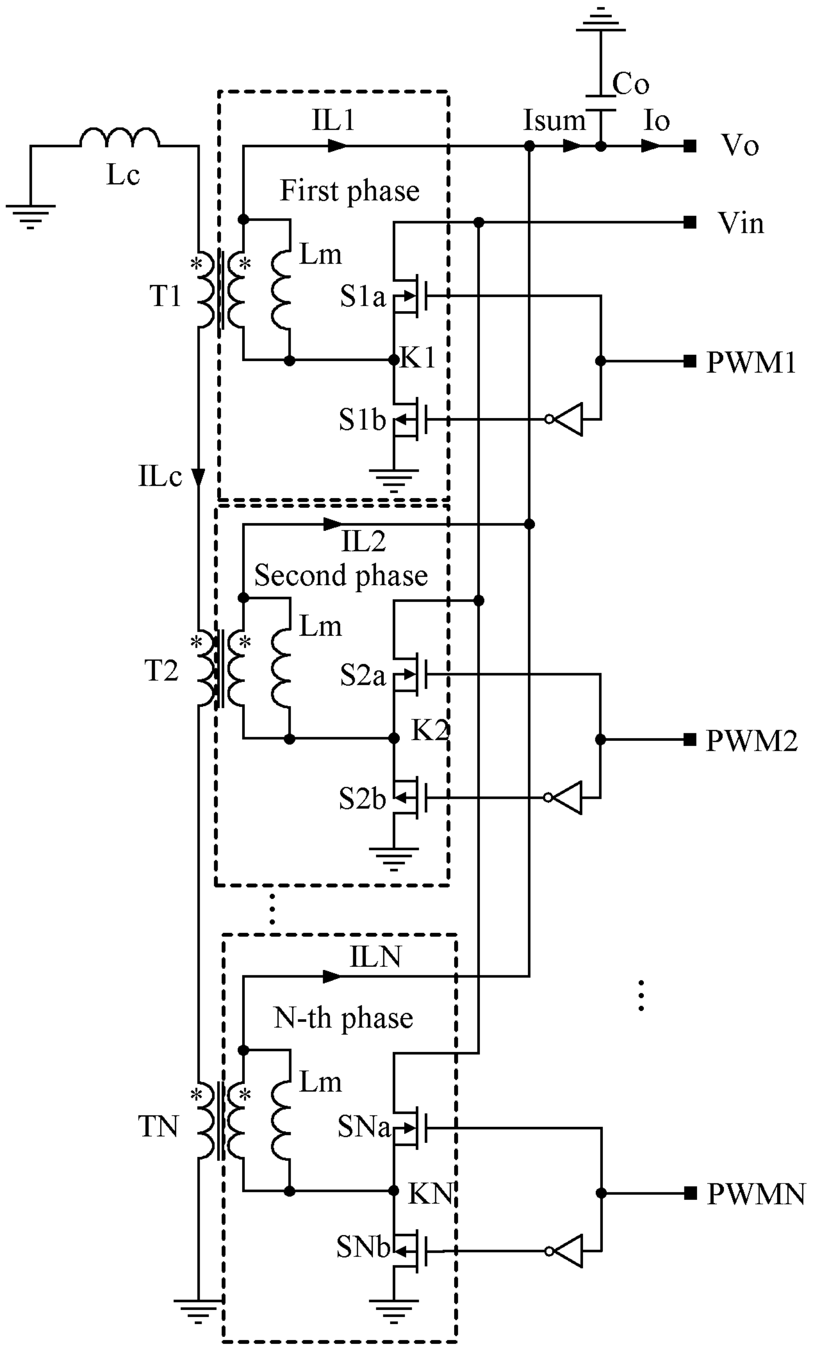
FIG. 1 is a schematic circuit diagram of an example trans-inductor voltage regulator, in accordance with embodiments of the present invention.

Referring now to FIG. 1, shown is a schematic circuit diagram of an example trans-inductor voltage regulator, in accordance with embodiments of the present invention. In this particular example, the trans-inductor voltage regulator (TLVR) can include N switching circuits coupled in parallel between the input terminal and the output terminal, where N is a positive integer greater than 1. Also, the switching circuit of each phase may correspond to one of N transformers, such as the switching circuit of j-th phase corresponding to transformer Tj. For example, j is a positive integer greater than or equal to 1 and less than or equal to N. The primary winding of transformer Tj may be utilized as the inductor in the switching circuit of j-th phase, and the secondary windings of all transformers be coupled in series. In this particular example, each switching circuit is a buck circuit, but other topologies (e.g., a boost circuit) can additionally or alternatively utilized in certain embodiments.

The switching circuit of each phase can include first and second power switches. In the example of the j-th phase, the first power end of power switch Sja may receive input voltage Vin, the second power end of power switch Sja can connect with the first power end of power switch Sjb, and the second power end of power switch Sjb can connect with the reference ground. For example, power switch Sja is the main power switch, and the common end of power switches Sja and Sjb is switching node Kj. The first end of primary winding of transformer Tj can connect to switching node Kj, and the second end of primary winding of transformer Tj can connect to the high potential end of the output terminal of the TLVR, in order to generate output voltage Vo. For example, the excitation inductor of transformer Tj is inductor Lm. The first and second power switches in each switching circuit can be driven by the corresponding switch control signal PWMj. Output capacitor Co can connect between the high potential end of the output terminal of the TLVR and the reference ground. For example, Isum is the sum of inductor current IL1-ILN of each phase. In addition, the secondary windings of transformers T1-TN and compensation inductor Lc can connect in series to form a compensation inductor loop, where ILc is the loop current of the compensation inductor loop.

Due to introduction of a compensation inductor, the change of inductor current of one of N phases can be immediately reflected to other phases through the transformer. Therefore, the rising slope of the inductor current of the switching circuit of the j-th phase can be equal to: the sum of the rising slope of the inductor current of the switching circuit of the j-th phase when the compensation inductor is not added, and the rising slope of the inductor current generated on the switching circuit of the j-th phase by the switching circuits of other phases when the compensation inductor is added. For example, the switching circuits of other phases can be coupled to the switching circuit of the j-th phase through the compensation inductor. Therefore, the rising slope of the inductor current of each phase may be related to the number of phases of the switching circuits simultaneously conducting in the TLVR. For example, rising slope SRj_TLVR(t) of the inductor current of the j-th phase at the transient state of the TLVR can be as follows in Formula (1).

$$\text{SRj\_TLVR}(t) = \left(\frac{a_j(t)\cdot Vin - Vo}{Lm} + \frac{x(t)\cdot Vin - N\cdot Vo}{Lc}\right) \quad (1)$$

Here, $a_j(t)$ is determined by switch control signal PWMj of the j-th phase. When switch control signal PWMj of the j-th phase is active, $a_j(t)=1$. When switch control signal PWMj of the j-th phase is inactive, $a_j(t)=0$. Here, x(t) is the number of phases in which the switch control signal is active at the same time in the TLVR; that is, the number of phases that are turned on at the same time in the TLVR. It can be seen from Formula (1) that when the multi-phase switch control signals are active at the same time, the rising slope of the inductor current of the corresponding phase in TLVR can increase. This is much larger than that of a traditional multi-phase voltage regulator without transformer and compensation inductor, accordingly improving the transient performance of the TLVR. However, the rapid increase of the rising slope of the inductor current of the corresponding phase can result in overshoot of the inductor current of the corresponding phase, which can lead to overheating or even burning of the chip.

Accordingly, particular embodiments provide a control method for adjusting the interval time between the turn-on moments of the switching circuits of the adjacent two phases in the TLVR. When the load suddenly increases (e.g., when the load increases more than a predetermined amount within a predetermined time), the interval time between the turn-on moments of the switching circuits of the adjacent two phases in turn-on sequence can be adjusted to reduce the number of phases of the switching circuits that are simultaneously conducting. This can thereby reduce the rising slope of the inductor current of each phase and prevent overcurrent of the inductor current. The interval time between turn-on moments of switching circuits of adjacent two phases can be greater than or equal to a reference interval time when the load suddenly increases. For example, when the interval time between trigger moments of switching circuits of adjacent two phases is less than a reference interval time, the turn-on moment of switching circuit of a next phase in the adjacent two phases can be configured as a moment when the turn-on moment of switching circuit of a last phase in the adjacent two phases is delayed by the reference interval time. Also, when the interval time between trigger moments of switching circuits of adjacent two phases is not less than the reference interval time, the turn-on moment of switching circuit of the next phase in the adjacent two phases may be configured as the trigger moment of switching circuit of the next phase.

For example, the reference interval time can be positively correlated with a maximum inductor current in all phases, and negatively correlated with the threshold current. Further, when an output current of the trans-inductor voltage regulator is greater than a first threshold, it can be determined that the load suddenly increases, and the interval time between turn-on moments of switching circuits of adjacent two phases can be thereby adjusted. In another example, when an output voltage of the trans-inductor voltage regulator is less than a voltage threshold, it can be determined that the load suddenly increases, thereby adjusting the interval time between turn-on moments of switching circuits of adjacent two phases. Any suitable approach for determining the sudden increase of load can be utilized in certain embodiments.

Figure 2:
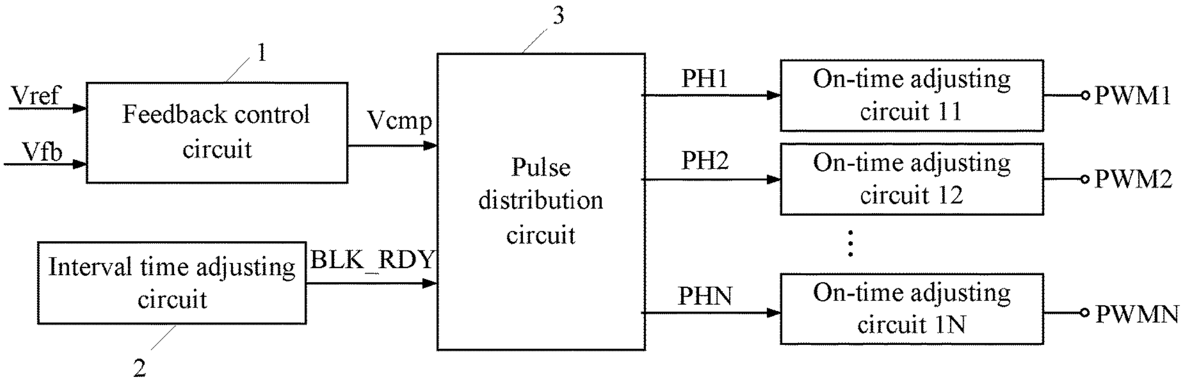
FIG. 2 is a schematic circuit diagram of an example control circuit of the trans-inductor voltage regulator, in accordance with embodiments of the present invention.

Referring now to FIG. 2, shown is a schematic circuit diagram of an example control circuit of the trans-inductor voltage regulator, in accordance with embodiments of the present invention. In this particular example, the control circuit can include feedback control circuit 1, interval time adjusting circuit 2, pulse distribution circuit 3, and a plurality of on-time adjusting circuits 11-1N. For example, feedback control circuit 1 can generate comparison signal Vcmp according to feedback signal Vfb of output voltage Vout of the trans-inductor voltage regulator and reference signal Vref. As exemplified herein, a constant on-time (COT) control mode is utilize, but any suitable control mode can be employed in certain embodiments. In the COT control mode, feedback control circuit 1 may generate comparison signal Vcmp by comparing feedback signal Vfb against reference signal Vref, and the pulses of comparison signal Vcmp may be utilized as the set signal of the switch control signal. In this example, a ripple signal representing the ripple of the inductor current can be superimposed on feedback signal Vfb, in order to generate comparison signal Vcmp.

Interval time adjusting circuit 2 can adjust the interval time between the turn-on moments of switching circuits of adjacent two phases in turn-on sequence when the load of the trans-inductor voltage regulator suddenly increases, in order to reduce the number of phases of the switching circuits that are turned on at the same time, and to reduce a rising slope of an inductor current of each phase, such that an inductor current of each phase is not greater than a threshold current. Interval time adjusting circuit 2 can generate an appropriate reference interval time Tblk when the load changes to a certain extent (e.g., when the load suddenly increases), in order to adjust the interval time of the switch control signals of the switch circuits of the adjacent two phases in the transient process. This is such that the interval time between the turn-on moments of the switch circuits of the adjacent two phases is greater than or equal to the reference interval time, and thereby adjusting the rising slope of the inductor current of each phase.

In this example, the interval time is the interval between the turn-on moments of the main power switches of switching circuits in the adjacent two phases; that is, the interval between the rising edges of the switch control signals of switching circuits in the adjacent two phases. Interval time adjusting circuit 2 can generate indication signal BLK_RDY, where when an interval time between a corresponding pulse (e.g., a trigger signal) to be allocated to the switching circuit of the next phase in the adjacent two phases and a pulse corresponding to the switching circuit of the last phase in the adjacent two phases reaches reference interval time Tblk, indication signal BLK_RDY can be activated. This can allow the corresponding pulse or trigger signal to be distributed to the switching circuit of the next phase, where the trigger signal can trigger the power switch in the switching circuit to start turning on. The interval time between original trigger signals corresponding to adjacent two phases can be determined by the interval time between adjacent two pulses in comparison signal Vcmp. The original trigger signal of the switch circuit can control the trigger time of the switch circuit.

Pulse distribution circuit 3 can adjust pulses of comparison signal Vcmp (e.g., the trigger signal) and output adjusted trigger signals which are distributed to the switching circuit of each phase in turn, in order to control the turn-on sequence of the switching circuit of each phase. Pulse distribution circuit 3 may receive comparison signal Vcmp and indication signal BLK_RDY, and can adjust the interval time between the pulse of comparison signal Vcmp to be allocated to the switching circuit of the next phase and the pulse of comparison signal Vcmp corresponding to the switching circuit of the last phase before the pulse of comparison signal Vcmp is distributed to the switching circuit of the next phase. This may ensure that the interval time between the pulse to be distributed to the next phase and the pulse corresponding to the last phase is not less than reference interval time Tblk. Pulse distribution circuit 3 can output N adjusted trigger signals PH1-PHN corresponding to the switching circuits of N phases.

In this example, when the corresponding pulse in comparison signal Vcmp corresponding to the next phase arrives before indication signal BLK_RDY is active, this can indicate that the interval time between the corresponding pulse corresponding to the next phase and the pulse corresponding to the last phase is less than reference interval time Tblk. As a result, the corresponding pulse may not be transmitted to the next phase until indication signal BLK_RDY is active, and the interval time between the turn-on moments of switching circuits of two adjacent phases may be equal to reference interval time Tblk. At this time, the interval time between the adjusted trigger signals of the adjacent two phases can be determined by reference interval time Tblk. However, when the corresponding pulse in comparison signal Vcmp (e.g., the trigger signal) corresponding to the next phase arrives after indication signal BLK_RDY is active, this can indicate that the interval time between the corresponding pulse corresponding to the next phase and the pulse corresponding to the last phase is greater than reference interval time Tblk. As such, the corresponding pulse can be directly transmitted to the current phase when corresponding pulse comes, and at this time, the interval time between the adjusted trigger signals of the adjacent two phases may be determined by the interval time between adjacent two pulses in comparison signal Vcmp.

The control circuit can also include on-time adjusting circuits 11-1N, which may respectively receive corresponding adjusted trigger signals PH1-PHN, in order to respectively control switch control signals PWM1-PWMN to be set high and control the on-time of the switching circuit of each phase. Thus, switch control signals PWM1-PWMN can be generated to respectively control the switching states of the main power switch in the switching circuit of the corresponding phase. In one example, the on-time of each phase is a fixed value, but variable values can also be utilized in certain embodiments.

It should be understood that due to the sudden increase of the load, output voltage Vout drops or the output current increases, may result in comparison signal Vcmp being active. In other control method approaches, the interval time between pulses distributed to the switching circuits of adjacent two phases may be less than the reference interval time when the load suddenly increases. Thus in this case, the number of phases of the switching circuits conducting at the same time increases, and the rising slope of the inductor current of each phase increases, which can cause overcurrent. However, in the control method of particular embodiments, when the load suddenly increases, and if the interval time between the pulses distributed to the switching circuits of adjacent two phases is less than the reference interval time, the interval time between the adjusted trigger signals distributed by pulse distribution circuit 3 corresponding to adjacent two phases may be determined by the preset reference interval time Tblk. This can ensure that the interval time between the adjusted trigger signal allocated to the next phase and the adjusted trigger signal allocated to the last phase is not less than reference interval time Tblk.

However, if the time interval between the adjusted trigger signals corresponding to adjacent two phases is too long, the dynamic response speed of the system may be relatively slow. Therefore in one example, when the interval time between the pulses corresponding to adjacent two phases is less than reference interval time Tblk, the interval time between the adjusted trigger signals corresponding to adjacent two phases can be selected to be equal to reference interval time Tblk. In a steady state, because the interval time between the pulses corresponding to adjacent two phases is not less than reference interval time Tblk, it may only be necessary to directly distribute the pulses to the switching circuit according to the interval time between the pulses in comparison signal Vcmp corresponding to adjacent two phases. The adjustment process of the interval time is described in further detail below.

Figure 3:
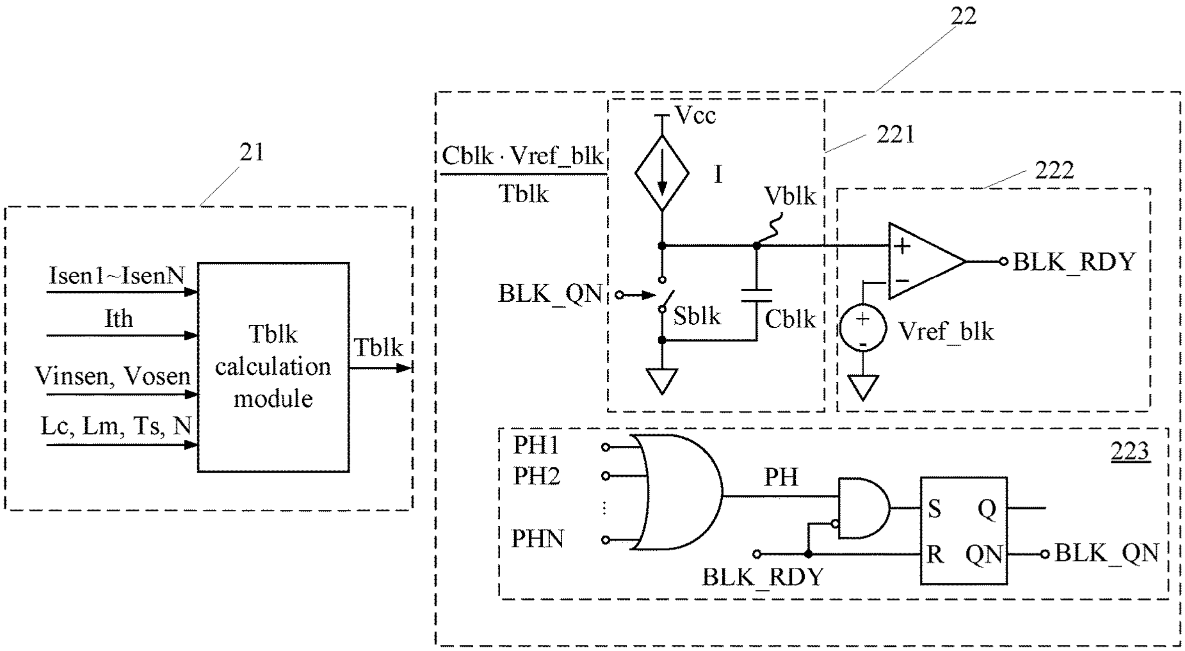
FIG. 3 is a schematic circuit diagram of an example interval time adjusting circuit of the trans-inductor voltage regulator, in accordance with embodiments of the present invention.

Referring now to FIG. 3, shown is a schematic circuit diagram of an example interval time adjusting circuit of the trans-inductor voltage regulator, in accordance with embodiments of the present invention. In this particular example, interval time adjusting circuit 2 can include configuration module 21 that may generate the reference interval time according to the rising slope of the inductor current of each phase, the threshold current, and a sampling value of the inductor current of each phase when the load suddenly increases. For example, configuration module 21 can obtain a first interval time corresponding to each phase according to the rising slope of the inductor current of each phase, and a difference between the threshold current and the sampling value of the inductor current of a corresponding phase, when the load suddenly increases. For example, a maximum value of all the first interval times corresponding to all phases can be configured as the reference interval time, such that the inductor current of each phase is not greater than the threshold current.

In one example, configuration module 21 can calculate the variation of the inductor current of each phase by calculating the rising slope of the inductor current of each phase when the load suddenly increases. Configuration module 21 can also calculate the first interval time corresponding to each phase by making the variation of the inductor current of each phase not greater than the difference between threshold current Ith and the sampling value of the inductor current of the corresponding phase when the load suddenly increases.

In order to realize overcurrent protection, when the load suddenly increases, i the variation of the inductor current of the j-th phase can be made not greater than the difference between threshold current Ith and sampling value Isenj of the inductor current of the j-th phase, in order to avoid over-current. For example, threshold current Ith represents the maximum allowable current value, and the length of the first interval time corresponding to each phase can be positively correlated with the magnitude of the inductor current of each phase and negatively correlated with the magnitude of threshold current Ith. As such, the reference interval time can be positively correlated with a maximum inductor current in all phases and negatively correlated with the threshold current.

From the above analysis, it can be seen that the rising slope of the inductor current of the j-th phase can be affected when other phases are turned on, so the variation of the inductor current of the j-th phase may be equal to the integral of the rising slope of the inductor current of the j-th phase in the interval from the moment when the j-th phase starts conducting to the moment when all other (N−1) phases end conducting. The length of this interval can be greater than or equal to Ton+(N−1)×Tblkj. In one example, the length of the interval is Ton+(N−1)×Tblkj, and the interval is the operating period. For example, the operating period can be from the moment when the first phase starts conducting to the moment when the N-th phase ends conducting. As another example, the operating period can be from the moment when the i-th phase starts conducting to the moment when the (i−1)-th phase ends conducting, and i is an integer greater than 1. Here, the on-time of each phase equal to the on-time of main power switch of each phase can be the same (e.g., Ton).

Configuration module 21 can integrate the rising slope of the inductor current of j-th phase expressed by the Formula (1) in the interval from moment $t_0$ when the load suddenly increases to moment $t_0$+Ton+(N−1)×Tblkj, in order to obtain the variation of the inductor current of the j-th phase when the load suddenly increases. Accordingly, the sum of the variation of the inductor current of the j-th phase and the sampling value of the inductor current of the j-th phase at moment $t_0$ may not be greater than current threshold Ith, and first interval time Tblkj that meets the conditions can be obtained. Here, the sum of the variation of the inductor current of the j-th phase and the sampling value of the inductor current of the j-th phase can be selected to be equal to current threshold Ith to obtain the minimum first interval time Tblkj. This is because the selected value of the first interval time can be longer than the calculated minimum first interval time Tblkj, but if the first interval time is too long, the dynamic performance of the system may be low and the transient response speed slow. The sum of the variation of the inductor current of the j-th phase and the sampling value of the inductor current of the j-th phase when the load suddenly increases can be selected to be equal to current threshold Ith, thereby obtaining first interval time Tblkj required when the inductor current of the j-th phase does not over-current. Also, the first interval time required when the inductor current of each phase does not over-current can be calculated, and then the maximum value of the first interval times may be selected and output as reference interval time Tblk.

For example, when the load current suddenly increases, configuration module 21 can calculate reference interval time Tblk according to sampling values Isen1-IsenN of the inductor currents of N phases, input voltage sampling signal Vinsen, output voltage sampling signal Vosen, compensation inductor Lc, excitation inductor Lm, and number N of all phases, in order to ensure that the inductor current of each phase to be not greater than threshold current Ith. Here: the moment when the load suddenly changes is $t_0$, and the sampling value of the inductor current of the j-th phase at moment $t_0$ is Isenj_int. Therefore, first interval time Tblkj calculated according to the inductor current of the j-th phase may satisfy the following Formula (2)

$$\int_{t_0}^{t_0+Ton+(N-1)\times Tblkj} \text{SRj\_TLVR}(t)dt = Ith - \text{Isenj\_int} \quad (2)$$

After calculating first interval time Tblkj for the inductor current of each phase, the maximum value of first interval times Tblk1-TblkN corresponding to N phases can be configured as reference interval time Tblk, such that the inductor current of each phase is not greater than threshold current Ith.

Interval time adjusting circuit 2 can also include a detection circuit to detect that the load increases to a preset value; that is, to detect that the load suddenly increases, in order to control configuration module 21 to recalculate the reference interval time. In one example, when the detection circuit detects that output voltage Vo is less than the voltage threshold, it can be determined that load current Io increases; that is, the load suddenly increases. In another example, when the detection circuit detects that output current is greater than the first threshold, it can be determined that the load suddenly increases. Configuration module 21 can recalculate the reference interval time when the detection circuit detects that the load suddenly increases. In the steady state, configuration module 21 may not calculate the reference interval time. Any suitable approach to detect the increase of load to a preset value, including detecting the output voltage or the output current, may be utilized in certain embodiments.

In addition, there are many ways for configuration module 21 to calculate the first interval time according to the Formula (2), which can be calculated directly, or by modifying the Formula (2) and discretizing by segments. Interval time adjusting circuit 2 can also include indication signal generating circuit 22 for generating indication signal BLK_RDY. When the interval time between trigger signals distributed to the switching circuits of adjacent two phases reaches preset reference interval time Tblk, indication signal BLK_RDY can be active, thereby allowing the corresponding trigger signal to be distributed to the switching circuit of the corresponding phase. Further, indication signal generating circuit 22 can start counting when the corresponding trigger signal of the current phase is active and indication signal BLK_RDY is inactive, and indication signal BLK_RDY can be active when the counting time reaches reference interval time Tblk.

Figure 4:
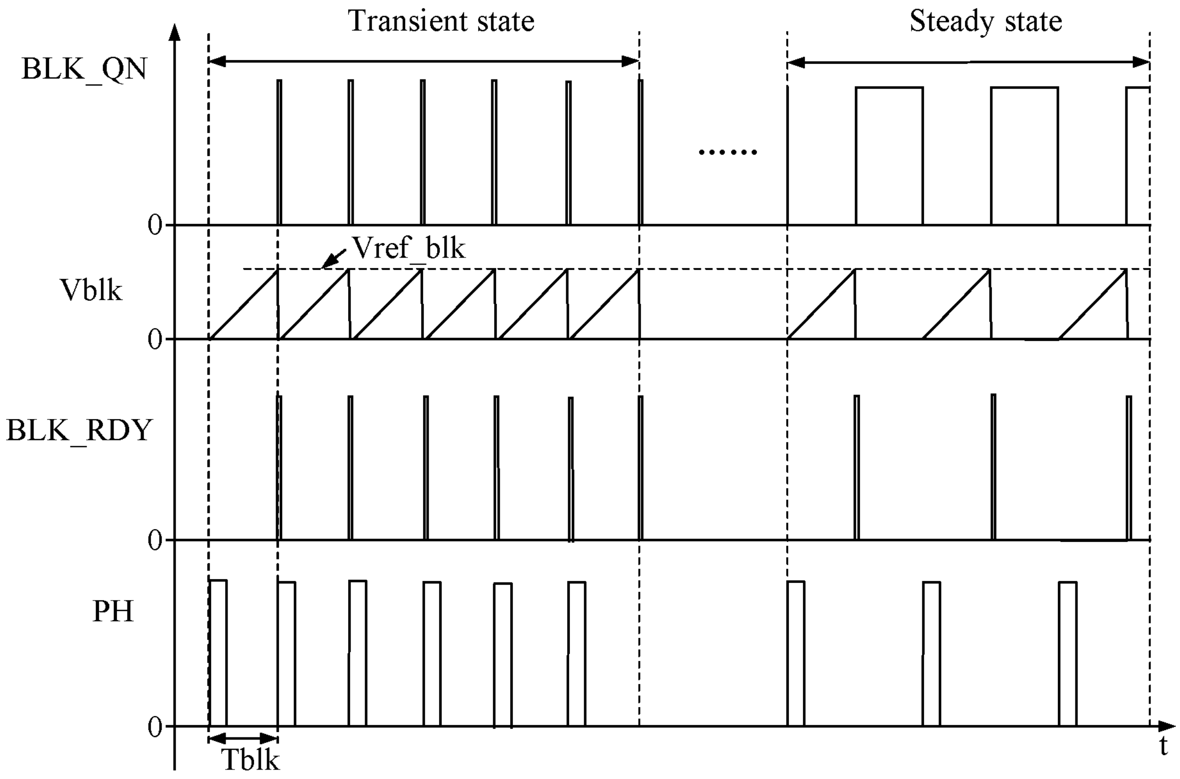
FIG. 4 is a waveform diagram of an example operation of the interval time adjusting circuit of the trans-inductor voltage regulator, in accordance with embodiments of the present invention.

Referring now to FIG. 4, shown is a waveform diagram of an example operation of the interval time adjusting circuit of the trans-inductor voltage regulator, in accordance with embodiments of the present invention. For example, signal PH is the signal obtained by superimposing trigger signals PH1-PHN of all phases. For example, signal PH can be obtained after trigger signals PH1-PHN of all phases through the logical OR-gate. The operating process of the interval time adjusting circuit is further described below with reference to FIGS. 3 and 4.

In one example, indication signal generating circuit 22 can include ramp signal generating circuit 221 for generating ramp signal Vblk, and comparison circuit 222 for comparing ramp signal Vblk against ramp reference signal Vref_blk to generate indication signal BLK_RDY. As shown in FIG. 4, ramp signal Vblk can start to rise when a trigger signal arrives and indication signal BLK_RDY is inactive. When ramp signal Vblk rises to ramp reference signal Vref_blk, indication signal BLK_RDY output by comparison circuit 222 can be active, and ramp signal Vblk may be reset to zero and then rise again when the next trigger signal of signal PH arrives. It should be understood that indication signal BLK_RDY is also a pulse signal, whereby the pulse width of indication signal BLK_RDY can ensure that capacitor Cblk is fully discharged.

Ramp signal generating circuit 221 can include current source I and switch Sblk connected in series between power supply Vcc and a reference ground, and capacitor Cblk connected in parallel with switch Sblk. For example, the current value of current source I can be equal to Cblk×Vref_blk/Tblk, such that capacitor Cblk is charged when switch Sblk is turned off. The time when voltage Vblk on capacitor Cblk rises from zero to ramp reference signal Vref_blk is the reference interval time Tblk.

Indication signal generating circuit 22 can also include reset circuit 223, which may receive trigger signals PH1-PHN and indication signal BLK_RDY to generate reset signal BLK_QN to control the switching states of switch Sblk. Reset circuit 223 can include an AND-gate, which may receive signal PH and the inverse signal of indication signal BLK_RDY, and the output terminal of the AND-gate can connect to the set terminal S of the RS flip-flop. The reset terminal R of the RS flip-flop may receive indication signal BLK_RDY, and inverse output terminal QN of the RS flip-flop can generate reset signal BLK_QN. When signal PH is active and indication signal BLK_RDY is inactive, reset signal BLK_QN can be set low, switch Sblk may be controlled to turn off, and ramp signal Vblk can start to rise. When indication signal BLK_RDY is active, reset signal BLK_QN can be activated (e.g., set high), and switch Sblk may be controlled to be turned on to reset ramp signal Vblk. In the steady state, because the interval time between pulses in signal PH is longer than reference interval time Tblk, when ramp signal Vblk rises to reference signal Vref_blk, indication signal BLK_RDY can be set high; however, the next pulse in signal PH has not yet arrived, so reset signal BLK_QN may remain high until the next pulse in signal PH arrives, and so on, as shown in FIG. 4.

Figure 5:
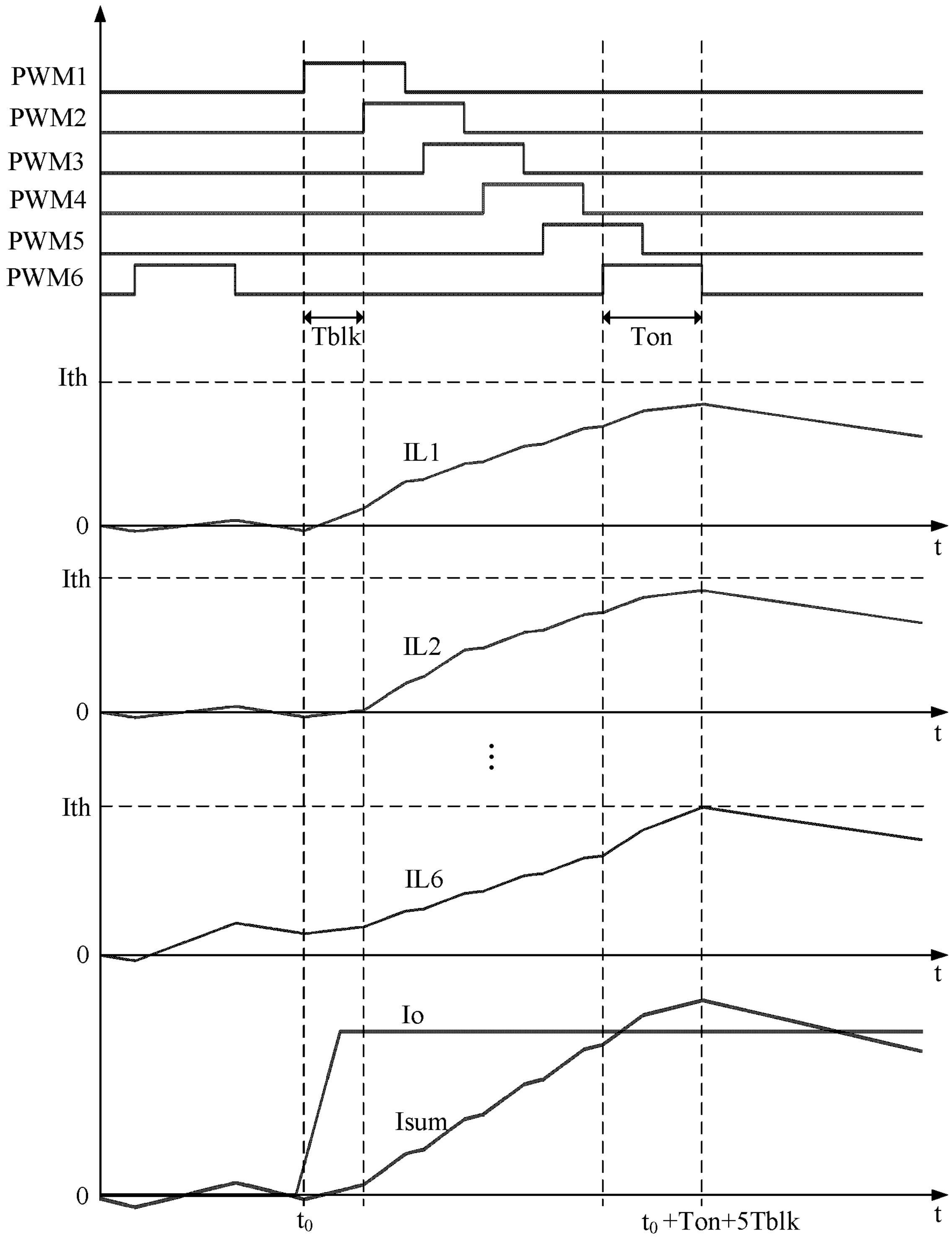
FIG. 5 is a waveform diagram of an example operation of the trans-inductor voltage regulator, in accordance with embodiments of the present invention.

Referring now to FIG. 5, shown is a waveform diagram of an example operation of the trans-inductor voltage regulator, in accordance with embodiments of the present invention. Here, taking 6 phases as an example, at moment t0, the load suddenly increases (e.g., output current Io suddenly increases to be greater than the first threshold, or the output voltage is less than the voltage threshold), and switch control signals PWM1-PWM6 may be staggered respectively by the adjusted reference interval time Tblk. In this example, the maximum instantaneous value of inductor currents IL1-IL6 of all phases may be threshold current Ith, and other instantaneous values may all be below threshold current Ith, such that overcurrent may not occur. In this way, the interval time of trigger signals transmitted to each phase can be adjusted to be equal to or greater than the pre-calculated reference interval time Tblk, such that the inductor current of each phase is not greater than threshold current Ith, and overcurrent protection can be realized.

Figure 6:
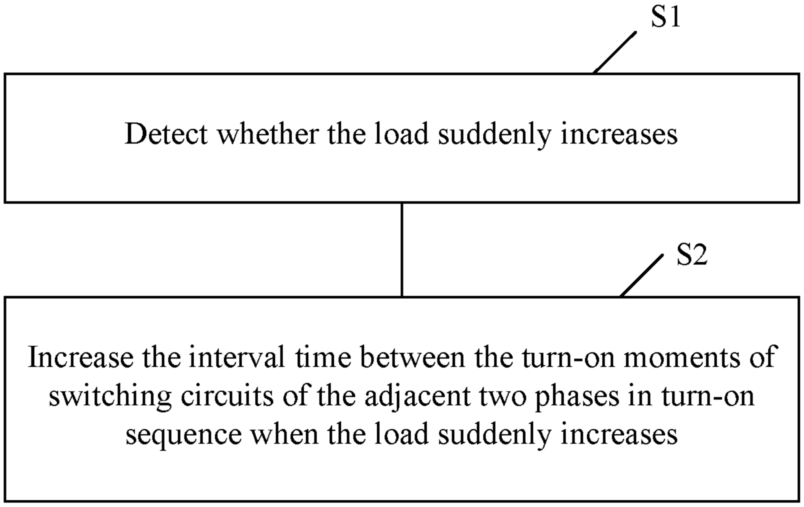
FIG. 6 is a flowchart of an example interval time adjusting method of the trans-inductor voltage regulator, in accordance with embodiments of the present invention.

Referring now to FIG. 6, shown is a flow diagram of an example interval time adjusting method of the trans-inductor voltage regulator, in accordance with embodiments of the present invention. At S1, whether the load suddenly increases can be detected. For example, whether the output voltage of the trans-inductor voltage regulator is less than the voltage threshold can be determined. In another example, whether the output current of the trans-inductor voltage regulator is greater than the first (current) threshold can be determined. When the output voltage of the trans-inductor voltage regulator is less than the voltage threshold, or when the output current of the trans-inductor voltage regulator is greater than the first threshold, it can be detected that the load suddenly increases.

At S2, when the load suddenly increases, the interval time can be increased between the turn-on moments of switching circuits of the adjacent two phases in turn-on sequence, thereby reducing the number of phases of switching circuits that are turned on at the same time, and reducing the rising slope of the inductor current of each phase, such that the inductor current of the switching circuit of each phase is not greater than the threshold current. The interval time between turn-on moments of switching circuits of adjacent two phases can be controlled to be greater than or equal to a reference interval time when the load suddenly increases. For example, the reference interval time may be positively correlated with a maximum inductor current in all phases and negatively correlated with the threshold current.

The reference interval time can be generated according to the rising slope of the inductor current of each phase, the threshold current, and a sampling value of the inductor current of each phase when the load suddenly increases. Further, a first interval time corresponding to each phase may be obtained according to the rising slope of the inductor current of each phase and a difference between the threshold current and the sampling value of the inductor current of a corresponding phase when the load suddenly increases. A maximum value of all the first interval times corresponding to all phases can be configured as the reference interval time, such that the inductor current of each phase is not greater than the threshold current.

For example, S2 can also include obtaining the maximum variation of the inductor current of the switching circuit of the j-th phase according to the difference between the threshold current and the sampling value of the inductor current of the switching circuit of the j-th phase at the moment when the load suddenly increases. S2 can also include calculating the rising slope of the inductor current of the switching circuit of the j-the phase when the load suddenly increases, and integrating the rising slope to obtain a corresponding integrated value. S2 can also include, by making the integrated value equal to the maximum variation of the inductor current of the switching circuit of the j-th phase, the first interval time required for the inductor current of the switching circuit of the j-th phase to be not greater than the threshold current can be obtained. S2 can also include selecting the maximum value from the obtained first interval times corresponding to switching circuits of all phase as the reference interval time.

In this way, by increasing the interval time between the turn-on moments of switching circuits of the adjacent two-phase when the load suddenly increases, particular embodiments may reduce the number of phases of the switching circuits in the trans-inductor voltage regulator that are turned on at the same time. This can reduce the rising slope of the inductor current of each phase during the turn-on period of the switching circuit of each phase, thereby suppressing the peak current, and realizing overcurrent protection of the chip, such as including preventing the chip from being burned due to excessive current.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:

a) a trans-inductor voltage regulator having a plurality of switching circuits coupled in parallel between an input terminal and an output terminal of the trans-inductor voltage regulator, wherein each switching circuit corresponds to one of a plurality of transformers, each transformer comprises a first winding and a second winding, the first winding is configured as an inductor of the corresponding switching circuit, and the second windings are coupled in series;

b) a control circuit having an interval time adjusting circuit configured to adjust an interval time between turn-on moments of switching circuits of adjacent two phases in turn-on sequence to be greater than or equal to a reference interval time when a load of the trans-inductor voltage regulator suddenly increases, in order to reduce a number of phases of the switching circuits that are turned on at the same time, and to reduce a rising slope of an inductor current of each phase, such that an inductor current of each phase is not greater than a threshold current; and c) wherein the interval time adjusting circuit comprises a configuration module configured to generate the reference interval time according to the rising slope of the inductor current of each phase, the threshold current, and a sampling value of the inductor current of each phase when the load suddenly increases.

2. The apparatus of claim 1, wherein the interval time adjusting circuit is configured to adjust the interval time between turn-on moments of switching circuits of adjacent two phases when an output voltage of the trans-inductor voltage regulator is less than a voltage threshold.

3. The apparatus of claim 1, wherein the interval time adjusting circuit is configured to adjust the interval time between turn-on moments of switching circuits of adjacent two phases when an output current of the trans-inductor voltage regulator is greater than a first threshold.

4. The apparatus of claim 1, wherein the reference interval time is positively correlated with a maximum inductor current in all phases, and negatively correlated with the threshold current.

5. An apparatus, comprising:

a) a trans-inductor voltage regulator having a plurality of switching circuits coupled in parallel between an input terminal and an output terminal of the trans-inductor voltage regulator, wherein each switching circuit corresponds to one of a plurality of transformers, each transformer comprises a first winding and a second winding, the first winding is configured as an inductor of the corresponding switching circuit, and the second windings are coupled in series;

b) a control circuit having an interval time adjusting circuit configured to adjust an interval time between turn-on moments of switching circuits of adjacent two phases in turn-on sequence to be greater than or equal to a reference interval time when a load of the trans-inductor voltage regulator suddenly increases, in order to reduce a number of phases of the switching circuits that are turned on at the same time, and to reduce a rising slope of an inductor current of each phase, such that an inductor current of each phase is not greater than a threshold current;

c) wherein when an interval time between trigger moments of switching circuits of adjacent two phases is less than the reference interval time, the turn-on moment of switching circuit of a next phase in the adjacent two phases is configured as a moment when the turn-on moment of switching circuit of a last phase in the adjacent two phases is delayed by the reference interval time; and d) wherein when the interval time between trigger moments of switching circuits of adjacent two phases is not less than the reference interval time, the turn-on moment of switching circuit of the next phase in the adjacent two phases is configured as the trigger moment of switching circuit of the next phase.

6. The apparatus of claim 1, wherein:

a) the configuration module is configured to obtain a first interval time corresponding to each phase according to the rising slope of the inductor current of each phase and a difference between the threshold current and the sampling value of the inductor current of a corresponding phase when the load suddenly increases; and b) a maximum value of all the first interval times corresponding to all phases is configured as the reference interval time, such that the inductor current of each phase is not greater than the threshold current.

7. The apparatus of claim 6, wherein the configuration module is configured to calculate a variation of the inductor current of each phase according to the rising slope of the inductor current of each phase when the load suddenly increases, and to calculate the first interval time corresponding to each phase by making the variation of the inductor current of each phase to be not greater than the difference between the threshold current and the sampling value of the inductor current of the corresponding phase when the load suddenly increases.

8. The apparatus of claim 7, wherein the variation of the inductor current of each phase is obtained by integrating the rising slope of the inductor current of each phase in a first interval, wherein the first interval is an interval from a moment when the switching circuit of a current phase starts turning on to a moment when the switching circuits of all other phases end turning on.

9. The apparatus of claim 1, wherein the rising slope of the inductor current of one of all phases is equal to a sum of the rising slope of the inductor current of the one phase when a compensation winding is not added and the rising slope of the inductor current generated on the one phase by other phases of all phases when the compensation winding is added, wherein the switching circuits of the other phases are coupled to the switching circuit of the one phase through the compensation winding.

10. The apparatus of claim 1, wherein the interval time adjusting circuit comprises a detection circuit configured to detect whether the load suddenly increases to control a configuration module to recalculate the reference interval time.

11. The apparatus of claim 1, wherein the interval time adjusting circuit comprises:

a) an indication signal generating circuit configured to generate an indication signal; and b) wherein when an interval time between a corresponding trigger signal to be allocated to the switching circuit of a next phase in the adjacent two phases and a trigger signal corresponding to the switching circuit of a last phase in the adjacent two phases reaches the reference interval time, the indication signal is active, in order to allow the corresponding trigger signal to be distributed to the switching circuit of the next phase, wherein the trigger signal is configured to trigger the switching circuit to be turned on.

12. The apparatus of claim 11, wherein:

a) when the trigger signal corresponding to the switching circuit of the next phase comes before the indication signal is active, the trigger signal is transmitted to the switching circuit of the next phase until the indication signal is active; and b) when the trigger signal corresponding to the switching circuit of the next phase comes after the indication signal is active, the trigger signal is transmitted to the switching circuit of the next phase when the trigger signal comes.

13. The apparatus of claim 11, wherein the indication signal generating circuit comprises:

a) a ramp signal generating circuit configured to generate a ramp signal, wherein the ramp signal starts rising when the trigger signal comes and the indication signal is inactive, and the ramp signal is reset when the indication signal is active; and b) a comparison circuit configured to generate the indication signal by comparing the ramp signal with a ramp reference signal, wherein the indication signal is active when the ramp signal rises to be greater than the ramp reference signal.

14. The apparatus of claim 13, wherein the ramp signal generating circuit comprises a current source and a switch connected in series, and a capacitor connected in parallel with the switch, wherein a current value of the current source is obtained by dividing a product of a capacitance value of the capacitor and the ramp reference signal by the reference interval time.

15. The apparatus of claim 14, wherein the indication signal generating circuit further comprises a reset circuit configured to receive the trigger signal and the indication signal to generate a reset signal to control the switch, wherein when the trigger signal comes and the indication signal is inactive, the reset signal is inactive to control the switch to be turned off, and when the indication signal is active, the reset signal is active to control the switch to be turned on.

16. The apparatus of claim 11, further comprising:

a) a feedback control circuit configured to generate a comparison signal according to a feedback signal of an output voltage of the trans-inductor voltage regulator and a reference signal; and b) a pulse distribution circuit configured to receive pulses in the comparison signal as the trigger signals and the indication signal to generate the adjusted trigger signals, wherein the adjusted trigger signals are sequentially distributed to the switching circuit of each phase to control the turn-on sequence of the switching circuit of each phase.

17. The apparatus of claim 16, wherein the pulse distribution circuit is configured to adjust an interval time between a corresponding pulse in the comparison signal to be distributed to the switching circuit of the next phase and a pulse corresponding to the switching circuit of the last phase before distributing the corresponding pulse to the switching circuit of the next phase, in order to output the adjusted trigger signal corresponding to the switching circuit of each phase, such that the interval time between pulses corresponding to switching circuits of adjacent two phases is not less than the reference interval time.

18. The apparatus of claim 16, wherein:

a) in a steady state, the interval time between trigger signals corresponding to switching circuits of adjacent two phases is determined by the comparison signal; and b) when the load suddenly increases, the interval time between trigger signals corresponding to the switching circuits of the adjacent two phases is determined by the reference interval time and the comparison signal.

* * * * *